(12) United States Patent
Cortes et al.

(10) Patent No.: US 8,879,117 B2
(45) Date of Patent: Nov. 4, 2014

(54) MARGIN ADJUSTMENT

(75) Inventors: Sebastia Cortes, Barcelona (ES); Marcos Izquierdo, Sant Cugat del Valles (ES); Francisco Javier Roses, Sant Quirze del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 370 days.

(21) Appl. No.: 12/788,174

(22) Filed: May 26, 2010

(65) Prior Publication Data

US 2011/0292411 A1    Dec. 1, 2011

(51) Int. Cl.
*G06F 15/00*    (2006.01)
*G03G 15/00*    (2006.01)
*G06F 3/12*    (2006.01)

(52) U.S. Cl.
CPC ............ *G06F 3/1285* (2013.01); *G06F 3/1232* (2013.01); *G06F 3/1254* (2013.01); *G03G 15/6508* (2013.01); *G06F 3/1208* (2013.01); *G03G 15/5029* (2013.01)
USPC .............................. 358/1.9; 358/1.18; 399/45

(58) Field of Classification Search
USPC .......................................................... 358/1.9
See application file for complete search history.

(56) References Cited

U.S. PATENT DOCUMENTS

| | | | | |
|---|---|---|---|---|
| 6,053,645 | A * | 4/2000 | Myung | 400/64 |
| 6,701,099 | B2 * | 3/2004 | Yokobori et al. | 399/45 |
| 7,548,328 | B2 | 6/2009 | Hult et al. | |
| 2003/0016259 | A1 * | 1/2003 | Otokita | 347/14 |
| 2005/0238377 | A1 * | 10/2005 | Morikawa | 399/81 |
| 2007/0036468 | A1 * | 2/2007 | Matsushita et al. | 382/305 |
| 2008/0192075 | A1 | 8/2008 | Campion et al. | |
| 2008/0202695 | A1 | 8/2008 | Baumbusch et al. | |
| 2008/0240751 | A1 * | 10/2008 | Miyata | 399/45 |
| 2009/0040561 | A1 * | 2/2009 | Sasaki | 358/1.18 |
| 2009/0114758 | A1 | 5/2009 | Yamada | |
| 2009/0273814 | A1 * | 11/2009 | Ohkawa | 358/448 |
| 2009/0313145 | A1 * | 12/2009 | Hamilton et al. | 705/30 |
| 2010/0025450 | A1 | 2/2010 | Nakamaki | |
| 2010/0117291 | A1 * | 5/2010 | Bridges et al. | 271/171 |
| 2010/0196041 | A1 * | 8/2010 | Otaki | 399/389 |
| 2010/0231939 | A1 * | 9/2010 | Yamamoto et al. | 358/1.9 |
| 2011/0102817 | A1 * | 5/2011 | Hoover et al. | 358/1.9 |
| 2013/0141742 | A1 * | 6/2013 | Lee | 358/1.13 |

FOREIGN PATENT DOCUMENTS

JP    2002338095    11/2002

* cited by examiner

*Primary Examiner* — Kimberly A Williams

(57) ABSTRACT

In one embodiment, a width of a print media is measured. A margin adjustment decision is made utilizing a margin instruction if the measured width is within an acceptable variance from a standard width of the media. The margin adjustment decision is applied to a plot of an image to be printed on the media.

20 Claims, 8 Drawing Sheets

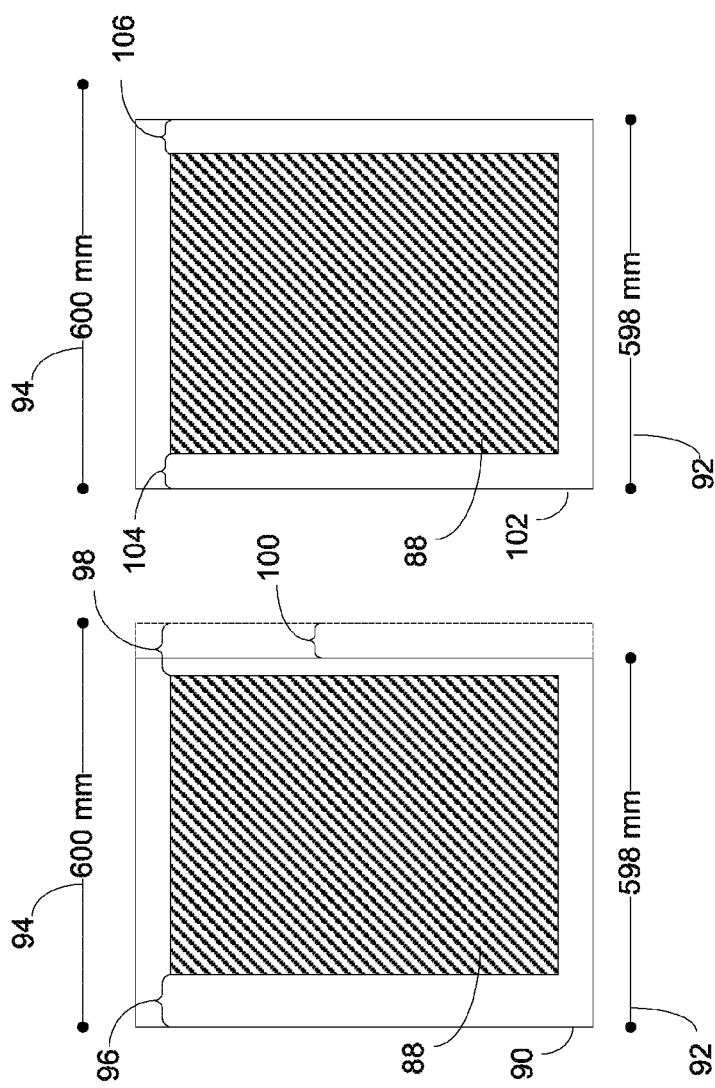
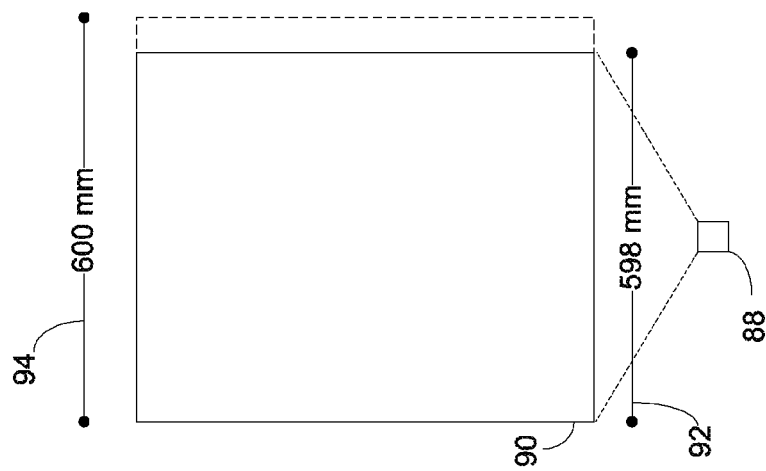
FIG. 8C
FIG. 8B
FIG. 8A

MARGIN ADJUSTMENT

BACKGROUND

A user of a printing device typically specifies a standard-sized media that is desired for printing in an application. For example, a user of a large format printer may choose from among several standard sized media rolls to print to a 600 mm media roll with a particular standard width. The user may make the choice of a media reasoning that in a particular application using 600 mm standard width media will result in the best appearance, the least media waste and/or no manual trimming.

BRIEF DESCRIPTION OF THE DRAWINGS

The accompanying drawings illustrate various embodiments and are a part of the specification. The illustrated embodiments are merely examples and do not limit the scope of the claims. Throughout the drawings, identical reference numbers designate similar, but not necessarily identical elements.

FIGS. 8A, 8B, and 8C depict an example in which a margin adjustment decision is made and applied to a plot of an image to be printed.

The same part numbers designate the same or similar parts throughout the figures.

DETAILED DESCRIPTION OF EMBODIMENTS

Due to manufacturing errors, a standard sized print media sometimes does not have an actual width that is the same as the listed width. For example, standard sized print media rolls used in large format printers typically have variability up to +−3 mm, as reflected by ISO width tolerances for print media with a width greater than 600 mm. Such variability between an actual width and a listed width can cause significant errors when a user or a printing application makes decisions that require accurate measurements. For example, a printing application may, based on input information regarding standard print media widths, make a decision to select a particular media width to avoid waste, to avoid manual trimming of a plot to achieve desired dimensions, to clip content to fit a particular print media size, or to put a print job on hold until a narrower or wider print media roll can be loaded. If the listed information regarding print media width is incorrect and such error is not detected, the user or printing application will make such decisions in error and the result will be poor quality, lost time, and/or wasted ink and print media. Embodiments described below were developed in an effort to provide a method and system to effectively manage a variation between a standard and an actual media width by making and applying a margin adjustment decision.

The following description is broken into sections. The first, labeled "Environment", describes an example environment in which embodiments may be implemented. The second section, labeled "Components", describes various physical and logical components utilized to implement various embodiments. The third section, labeled as "Operation", describes steps taken to implement various embodiments. The fourth section, labeled "Example", describes an example of making and applying a margin adjustment decision in accordance with an embodiment.

Figure 1:
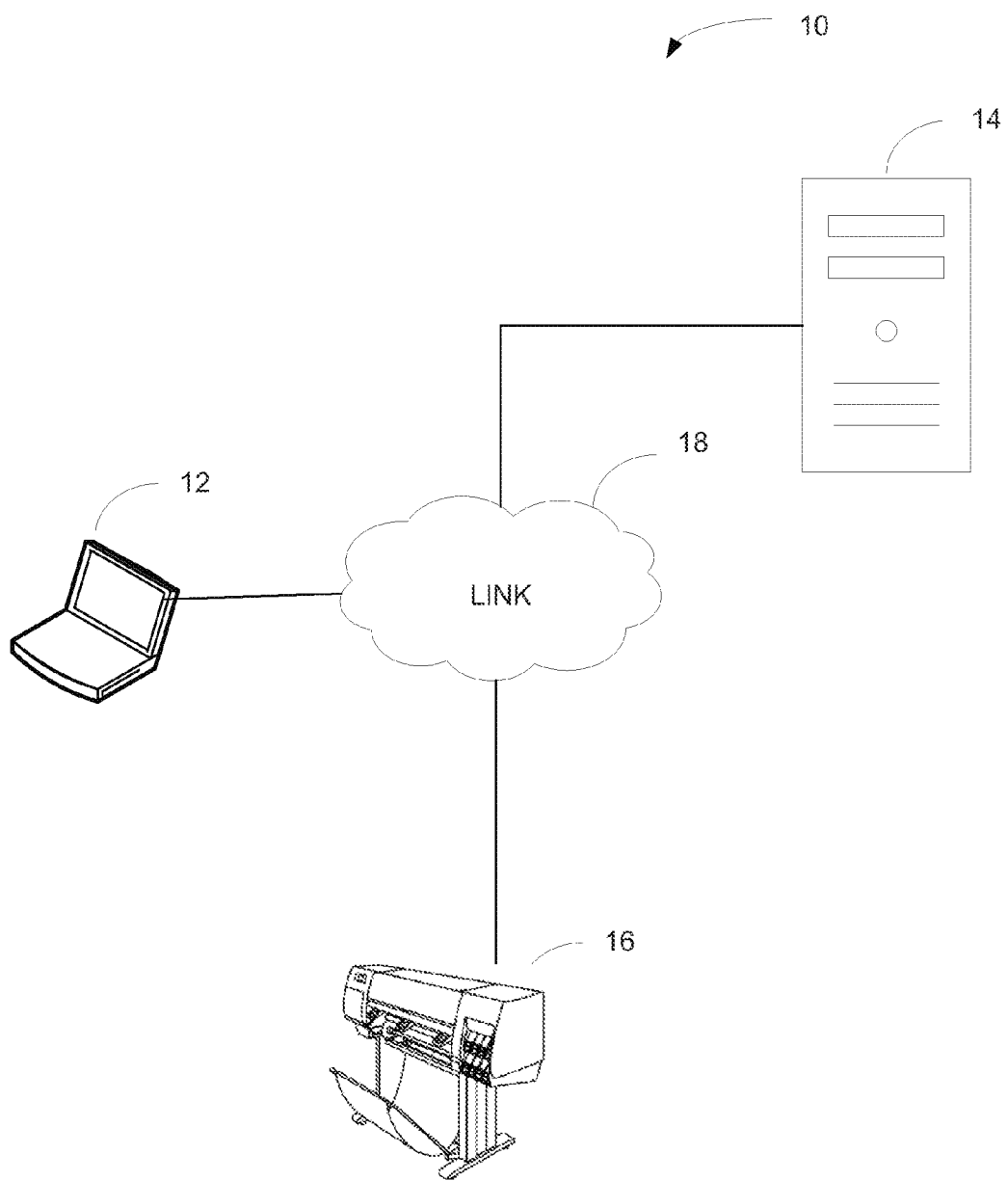
FIG. 1 depicts an example environment in which various embodiments may be implemented.

ENVIRONMENT: FIG. 1 depicts an example environment 10 in which various embodiments may be implemented. Environment 10 is shown to include a client 12, server 14, and a printer 16 interconnected via link 18.

Client 12 represents generally any computing device capable of receiving content from, and sending content to a server 14 and/or printer 16 via a link 18. Client 12 is also responsible for receiving and processing responses to requests for content. As used in this specification and the appended claims, "processing" includes executing instructions in memory to perform some transformation and/or computation on data in the computing device's memory. Processing may include displaying visual content such as text, images, and motion video on a monitor as well as broadcasting audio content via one or more speakers. Example client devices include laptop computers, desktop computers, smart phones, cell phones, personal digital assistants, net-books, digital media players, and the like.

Server 14 represents generally any computing device capable of serving content to, and receiving content from, a client 12 and/or a printer 16 via link 18. The term content refers to visual and audible information that can be presented to and received from a user of a client 12. Examples include images, audio, and video. Content can also include instructions designed to be processed by a client 12. Examples include HTML code and various scripts. As discussed with reference to FIG. 5 below, server 14 may be a print server operable to receive a print fulfillment request and/or content from a client 12 and in response cause a printer 16 to produce printed output.

Printer 16 represents generally any device operable to receive and process responses to requests to print content from client 12 and/or server 14, and to produce printed output.

Link 18 represents generally one or more of a cable, wireless, fiber optic, or remote connection via a telecommunication link, an infrared link, a radio frequency link, or any other connector or system that provides electronic communication. Link 18 may represent an intranet, the internet, or a combination of both. The paths followed by link 18 between client 12, server 14 and printer 16 as depicted in FIG. 1 represent the logical communication paths between these devices, not necessarily the physical paths between the devices.

Figure 2:
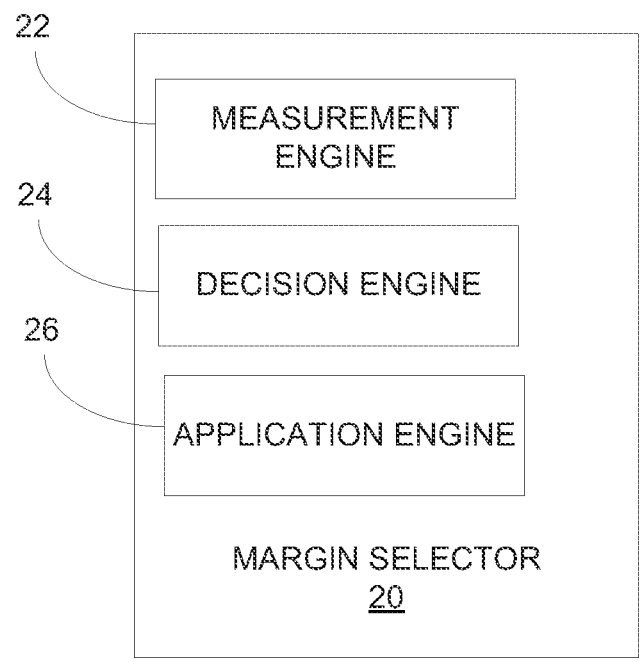
FIG. 2 depicts an example margin selector according to an embodiment.

COMPONENTS: FIG. 2 depicts an example of a margin selector 20. Margin selector 20 represents generally any combination of hardware and programming configured for use in making and applying a margin adjustment decision to a plot of an image to be printed. In the example of FIG. 2, margin selector 20 is shown to include a measurement engine 22, a decision engine 24 and an application engine 26.

Measurement engine 22 represents generally any combination of hardware and programming configured to measure a width of a print media. As used in this specification and the appended claims, a "print media" is an object that can be printed upon. "Print media" and "media" are used synonymously in this application. In an embodiment, measurement engine 22 includes a sensor, or utilizes a reading from a sensor external to measurement engine 22, to measure a width of the print media. In embodiments, the sensor can be an optical sensor, a laser sensor or an LED sensor. In an embodiment the sensor is positioned within a printer and configured to scan the print media and provide a reading at the time the media is loaded into a printer. In an embodiment the sensor is positioned within a printer and configured to scan the print media and provide a reading at printer startup or upon receipt of a print job. In an embodiment, the reading is made utilizing a device that is external to a printer, such as a handheld device, that includes a sensor.

Decision engine 24 represents generally any combination of hardware and programming configured to make a margin adjustment decision utilizing a margin instruction if the measured width is within an acceptable variance from a standard width of the media.

As used in this specification and the appended claims, a "standard width" is a declared or intended width for a print media absent production error or other errors. In an embodiment, the standard width may be obtained or determined in various ways, including via a user interface and via sensor reading. In an embodiment, the standard width may be received by utilizing a sensor to read a bar code or other marking that appears on the print media or supporting structure (e.g. a spindle that holds roll print media). In an embodiment, the standard width may be obtained or determined by utilizing a sensor to a read bar code or other marking that appears on packaging or written materials that accompany the print media. In an embodiment, the standard width may be received via user input at a user interface such as a keyboard, mouse or touchscreen.

As used in this specification and the appended claims, a measured width is within an "acceptable variance" from a standard width if the measured width deviates from the standard width and the deviation is of a degree that has been evaluated as tolerable. If the measured width is within an acceptable variance from a standard width printing can continue on the print media after application of a margin adjustment decision. In an example, the decision engine may be configured such that it recognizes a variability of +−3 mm as an acceptable variance for a print media roll with a standard width of 600 mm. In this example, a print media roll with a measured width between 597 mm to 603 mm is deemed as being within an acceptable variance from the standard width.

As used in this specification and the appended claims, a "margin" is a region that borders an image on a printed or displayed page. In an example, a plot can be designed such that the when printed an image that measures 600 mm in width will be bordered by a left margin of 6 mm and a right margin of 6 mm. In most cases the margin will be blank space, but other margins are possible, such as a pattern margin. In another example, a plot may be designed with a 0 mm margin, such that the image prints to an edge of the media. For example, a plot that is designed to print a 600 mm image on 600 mm width media is said to include left and right margins of 0 mm.

As used in this specification and the appended claims, a "margin instruction" is a directive as to how to configure a margin in the event a measured width of a media is within an acceptable variance from the standard width of the media. In an embodiment the margin instruction may be an instruction from a user and may be received via a user interface such as a keyboard, mouse or touch screen. In an embodiment, the margin instruction may be embedded in a plot of an image to be printed, and the margin instruction is read from the plot. As used in this specification and the appended claims, a "plot" is a representation of an image converted to programming language and/or numerical form so that it can stored and used in computing devices, servers, printers and other machines capable of performing calculations and manipulating data. As used in this specification and the appended claims, an "image" is a visual representation of an object, scene, person or abstraction (including text). The plot may include instructions as to how the image is to be printed. In embodiments, a plot may be expressed in a number of various languages and formats, including but not limited to HPGL/2 (Hewlett-Packard Graphics Language 2), PostScript, PDF (Portable Document Format), JPEG (Joint Photographic Experts Group standard), TIFF (Tagged Image File Format) and PCL3 (Printer Command Language 3). In an embodiment, the plot may have a margin instruction that is embedded using a PJL (Printer Job Language), the margin instruction to indicate to a printer how to manage the margin layout. In an embodiment the margin instruction may be a default instruction that is stored in, and read from, memory. In an example, the margin instruction may be an instruction to "center image". In another example of a margin instruction is an instruction to "keep left margin" or "keep right margin". In another example, a margin instruction may be an instruction to "do nothing" with respect to adjusting margins, i.e. make no margin adjustments, if the measured width is within an acceptable variance from the standard width.

As used in this specification and the appended claims, a "margin adjustment decision" is a decision as to how to configure a margin for a plot to be printed when a measured width of a media is within an acceptable variance of the media's standard width. The margin adjustment decision is made utilizing a margin instruction. In an example, a margin adjustment decision to modify both a first margin and a second margin on a print media may be made in response to a margin instruction to center an image. In another example, a margin adjustment decision to maintain a first margin and modify a second margin may be made in response to a margin instruction to keep one of a left margin or a right margin. In another example, a margin adjustment decision to make no margin adjustments may be made in response to a margin instruction that is received and which directs that no margin adjustments be made when the measured width of a media is within an acceptable variance from the media's standard width.

In an embodiment, if the measured width of a first media is not within an acceptable variance from the standard width of the first media, no margin adjustment decision is made and printing operations may be suspended until a second media that is equal to, or within an acceptable variance from, its standard width is made available.

Application engine 26 represents generally any combination of hardware and programming configured to apply the margin adjustment decision to a plot of an image to be printed on the media. In an embodiment, the margin adjustment decision may be applied to the plot by embedding the margin adjustment decision into the plot. In an embodiment, the margin adjustment decision may be embedded into the plot using a PJL that will indicate to the printer how to manage the margin layout. In an embodiment, the margin adjustment decision may be applied to a plot of an image to be printed on the media by communicating the decision to a printer separately from the plot, the printer being configured to accept the margin adjustment decision as superseding margin instructions set forth in the plot. In an embodiment, applying a margin adjustment decision to a plot results in the margin decision overwriting any default margin configurations that would have been effected but for such applying of the application decision.

Figure 3:
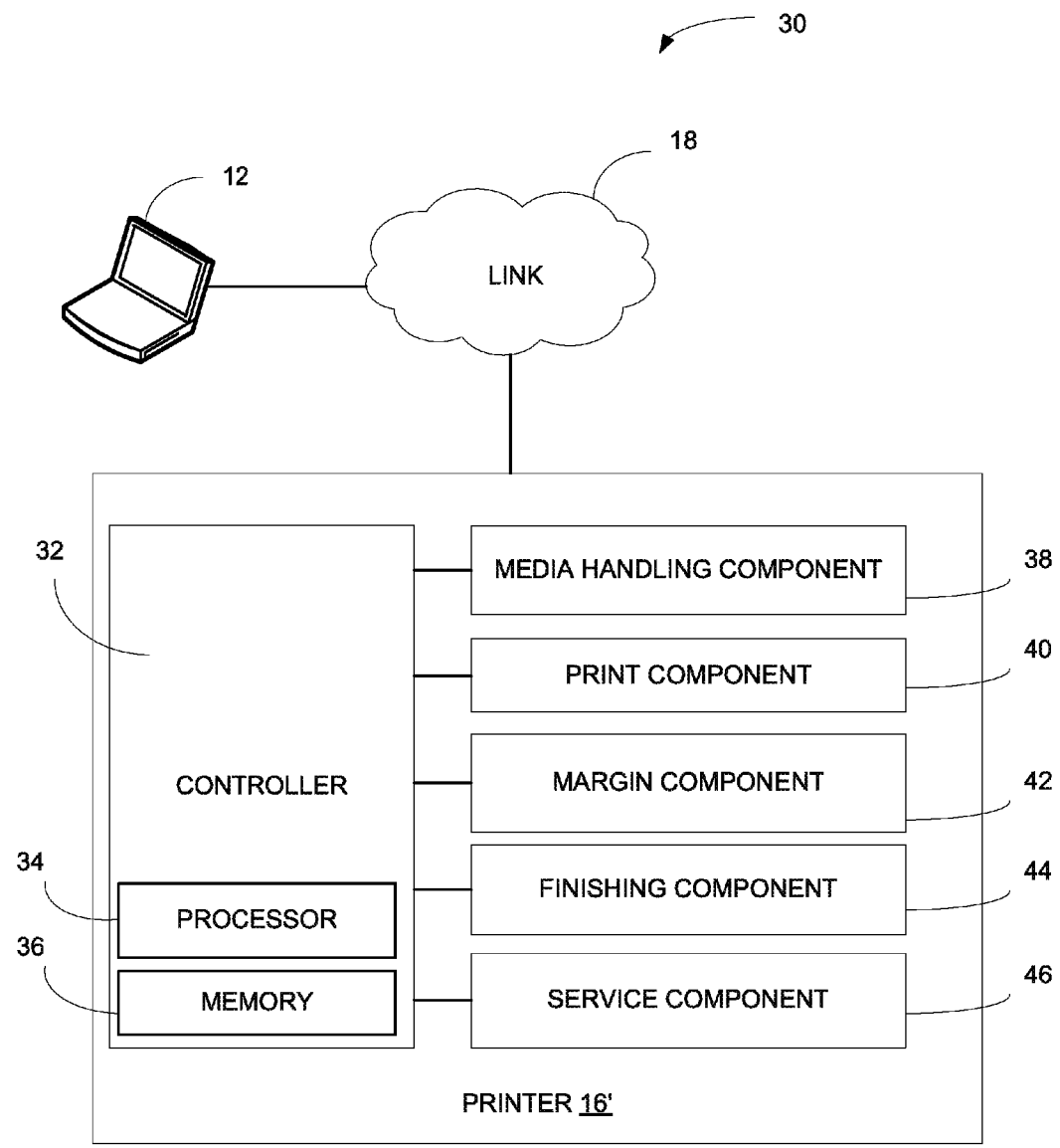
FIGS. 3-5 depict implementations of the margin selector of FIG. 2 according to various embodiments.

Margin selector 20 may be implemented in a number of environments, such as environment 30 of FIG. 3. Environment 30 includes client 12 and printer 16' interconnected via link 18. Printer 16' is shown to include a media handling component 38, a print component 40, a margin component 42, a finishing component 44, a service component 46, and a controller 32.

Media handling component 38 represents generally any combination of hardware and programming capable of transporting media through the printer 16'. Print component 40 represents generally any combination of elements capable of being utilized to form desired images on media. Media may include sheets, a continuous roll or web, or any other media on which a print image can be formed. In a given example, print component 40 may include a fluid ejection mechanism, each fluid ejection mechanism including multiple printheads configured to dispense ink or other fluid. As used in this specification and the appended claims, "printhead" includes a mechanism having a plurality of nozzles through which ink or other fluid is ejected. Examples of printheads are drop-on-demand inkjet printheads, thermo resistive printheads, piezo and resistive printheads. Some printheads may be part of a cartridge which also stores the fluid to be dispensed. Other printheads are standalone and are supplied with fluid by an off-axis ink supply. Finishing component 44 represents generally any combination of hardware and programming capable of performing a finishing operation on media. Such finishing operations include cutting, folding, laminating or any other action that affects the physical nature of the print media. Service component 46 represents generally any combination of elements capable of being utilized to service print component 40. Where, for example, print component 40 includes a printhead, service component 46 may be configured to function as a spittoon and an alignment calibrator.

Margin component 42 represents generally any programming, that, when executed, implements the functionality of the margin selector of FIG. 2. In particular, margin component 42, when executed by controller 32, is responsible for measuring a width of a print media, making a margin adjustment decision utilizing a margin instruction if the measured width is within an acceptable variance from a standard width of the media, and applying the margin adjustment decision to a plot of an image to be printed on the media. In an embodiment, a reading from a sensor is utilized in measuring a width of the print media. In an embodiment, the standard width is received via a sensor reading or a user interface. In an embodiment, the margin instruction may be embedded in a plot of an image to be printed, and the margin instruction is read from the plot. In an embodiment the margin instruction may be a default instruction that is stored in, and read from, memory. In an embodiment, a margin adjustment decision to modify both a first margin and a second margin on a print media may be made in response to a margin instruction to center an image on the media. In an embodiment, a margin adjustment decision to maintain a first margin and modify a second margin may be made in response to a margin instruction to maintain one margin, or to maintain one of a left margin or a right margin. In another example, a margin adjustment decision to make no margin adjustments may be made in response to a margin instruction that directs that no margin adjustments be made when the measured width of a media is within an acceptable variance from the media's standard width. In an embodiment, the margin adjustment decision may be applied to the plot by embedding the margin adjustment decision into the plot. In an embodiment, a plot that has had a margin adjustment decision applied to it is utilized during printing of the image on the media.

As used in this specification, controller 32 represents generally any combination of elements capable of coordinating the operation of components 38, 40, 42, 44 and 46. In a given implementation, the controller 32 includes a processor 34 and a memory 36. The processor 34 may represent multiple processors, and the memory 36 may represent multiple memories. In an embodiment, the controller 32 may include a number of software components that are stored in a computer-readable medium, such as memory 36, and are executable by processor 34. In this respect, the term "executable" includes a program file that is in a form that can be directly (e.g. machine code) or indirectly (e.g. source code that is to be compiled) performed by the processor 34. An executable program may be stored in any portion or component of memory 36.

Figure 4:
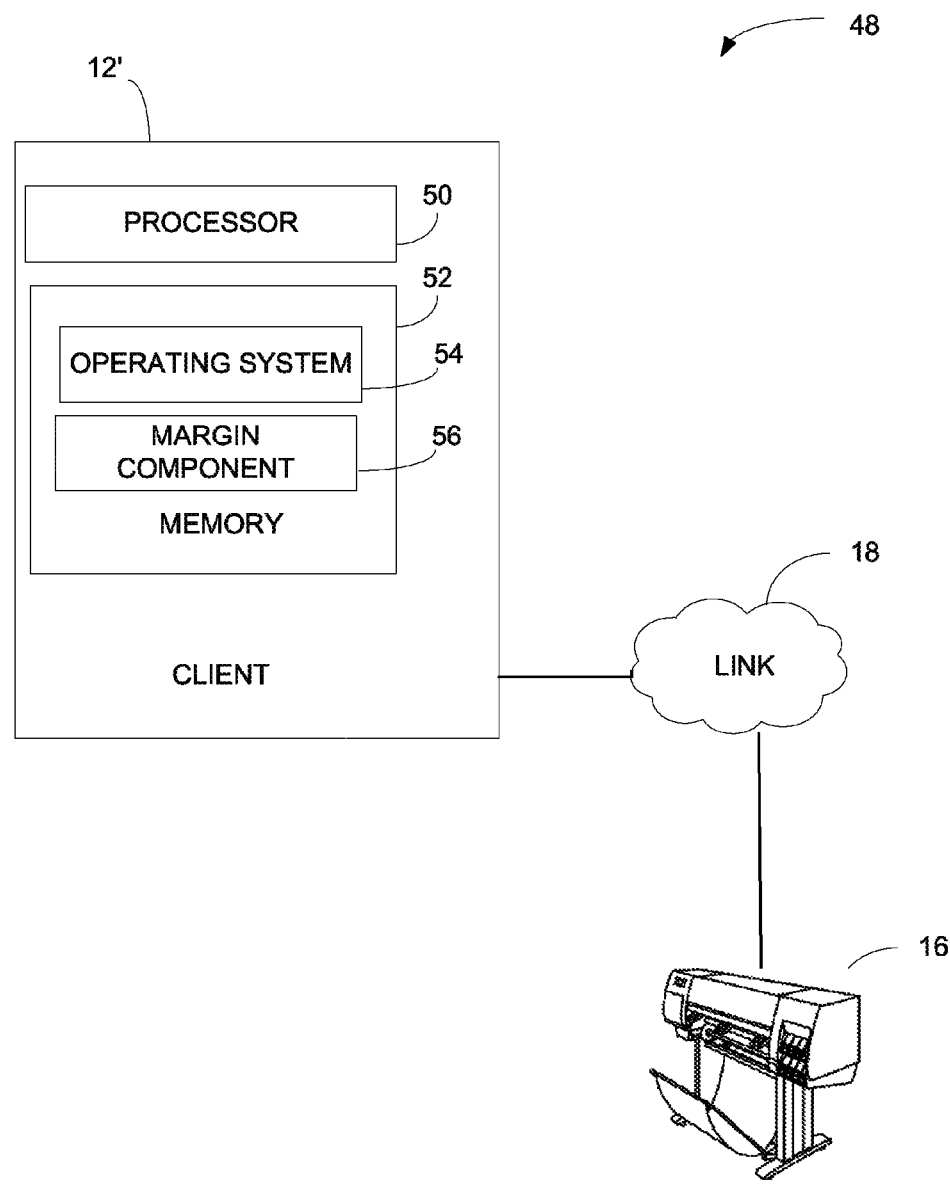

Moving to FIG. 4, an implementation is depicted in which some of the actions taken by printer 16' in FIG. 3 are now taken by client 12'. Environment 48 includes a client 12', a printer 16 and a link 18. In an embodiment, client 12' may be a laptop computer and is shown to include a processor 50 and memory 52. Processor 50 represents generally any device capable of executing program instructions stored in memory 52. Memory 52 represents generally any memory configured to store program instructions and other data. Memory 52 is shown to include operating system 54, and margin component 56. Operating system 54 represents generally any software platform on top of which other programs or applications such as the margin component 56 run.

Margin component 56 represents generally any programming that, when executed, implements the functionality of the margin selector 20 of FIG. 2. In particular, margin component 56, when executed by processor 50, is responsible for measuring a width of a print media, making a margin adjustment decision utilizing a margin instruction if the measured width is within an acceptable variance from a standard width of the media, and applying the margin adjustment decision to a plot of an image to be printed on the media. In an embodiment, a reading from a sensor is utilized in measuring a width of the print media. In an embodiment, the standard width is received via a sensor reading or a user interface. In an embodiment, the margin instruction may be embedded in a plot of an image to be printed, and the margin instruction is read from the plot. In an embodiment the margin instruction may be a default instruction that is stored in, and read from, memory. In an embodiment, a margin adjustment decision to modify both a first margin and a second margin on a print media may be made in response to a margin instruction to center an image on the media. In an embodiment, a margin adjustment decision to maintain a first margin and modify a second margin may be made in response to a margin instruction to maintain one margin, or to maintain one of a left margin or a right margin. In another example, a margin adjustment decision to make no margin adjustments may be made in response to a margin instruction that directs that no margin adjustments be made when the measured width of a media is within an acceptable variance from the media's standard width. In an embodiment, the margin adjustment decision may be applied to the plot by embedding the margin adjustment decision into the plot. In an embodiment, a plot that has had a margin adjustment decision applied to it is utilized during printing of the image on the media.

Printer 16 represents generally any combination of hardware and programming capable of receiving a print job that includes a digital representation of an image from the client 12', directly or indirectly via link 18, and producing printed output that includes a representation of the image on a print medium.

Figure 5:
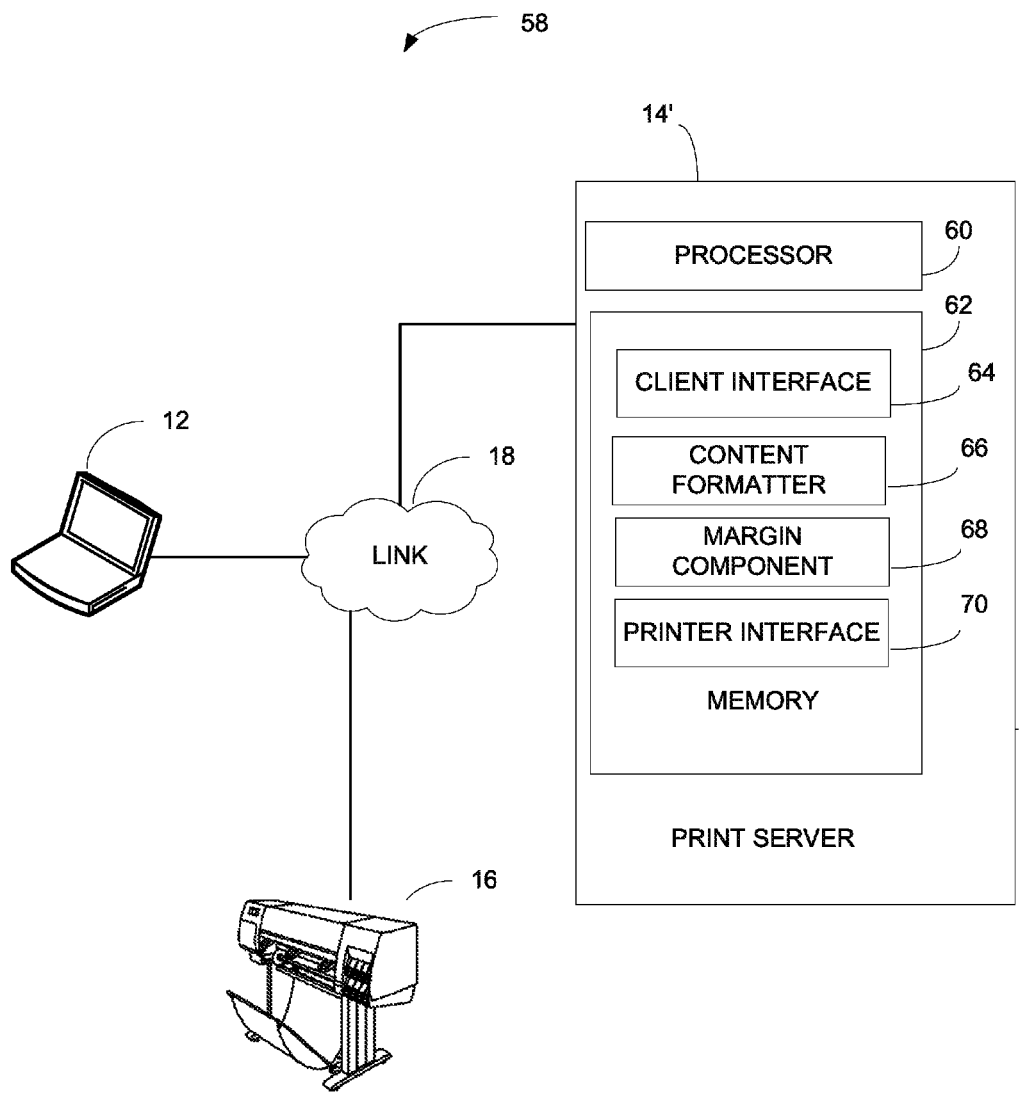

Moving to FIG. 5, an implementation is depicted in which some of the actions taken by printer 16' in FIG. 3 are now taken by a print server 14'. In particular, client 12 may send a print job directly or indirectly via link 18, to print server 14', and a margin component 68 residing on the print server 14' may be utilized in the making and application of a margin adjustment decision.

Environment 58 includes a client 12, a print server 14', a printer 16, and a link 18. In an embodiment client 12 may be a laptop computing device with Bluetooth®, internet, wireless or wired connectivity to printer 16 and to print server 14' via the link 18. Printer 16 represents generally any combination of hardware and programming capable of receiving a print job from the print server 14' and fulfilling the print job as printed output on a print medium.

In an embodiment, print server 14' is shown to include a processor 60 and memory 62. Processor 60 represents generally any device capable of executing program instructions stored in memory 62. Memory 62 represents generally any memory configured to store program instructions and other data. Memory 62 is shown to include a client interface 64, a content formatter 66, a margin component 68, and a printer interface 70. Client interface 64 represents generally any combination of hardware and programming capable of receiving a print job from a client 12 or any combination of hardware and software configured to send a print job. Content formatter 66 represents generally any combination of hardware and programming operable to format received content for printing. Such may include formatting the content, as-is, into a format compatible for printing by printer 16. Example formats include HPGL/2, PostScript, PDF, JPEG, TIFF and PCL3 (Printer Command Language 3.

Margin component 68 in combination with print server 14' represent generally any programming that, when executed, implement the functionality of the margin selector 20 of FIG. 2. In particular, margin component 68, when executed by processor 60, is responsible for measuring a width of a print media, making a margin adjustment decision utilizing a margin instruction if the measured width is within an acceptable variance from a standard width of the media, and applying the margin adjustment decision to a plot of an image to be printed on the media. In an embodiment, a reading from a sensor is utilized in measuring a width of the print media. In an embodiment, the standard width is received via a sensor reading or a user interface. In an embodiment, the margin instruction may be embedded in a plot of an image to be printed, and the margin instruction is read from the plot. In an embodiment the margin instruction may be a default instruction that is stored in, and read from, memory. In an embodiment, a margin adjustment decision to modify both a first margin and a second margin on a print media may be made in response to a margin instruction to center an image on the media. In an embodiment, a margin adjustment decision to maintain a first margin and modify a second margin may be made in response to a margin instruction to maintain one margin, or to maintain one of a left margin or a right margin. In another example, a margin adjustment decision to make no margin adjustments may be made in response to a margin instruction that directs that no margin adjustments be made when the measured width of a media is within an acceptable variance from the media's standard width. In an embodiment, the margin adjustment decision may be applied to the plot by embedding the margin adjustment decision into the plot. In an embodiment, a plot that has had a margin adjustment decision applied to it is utilized during printing of the image on the media.

Printer interface 70 represents generally a combination of hardware and programming capable of communicating a print job or formatted content to printer 16. Printer interface 70 may be responsible for receiving communications from printer 16 and then using client interface 64 to route the communications back to client 12. Such communications may include an indication that the print job was received, the print job has been printed, any error messages, and any other information related to the print job.

In foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media.

Figure 6:
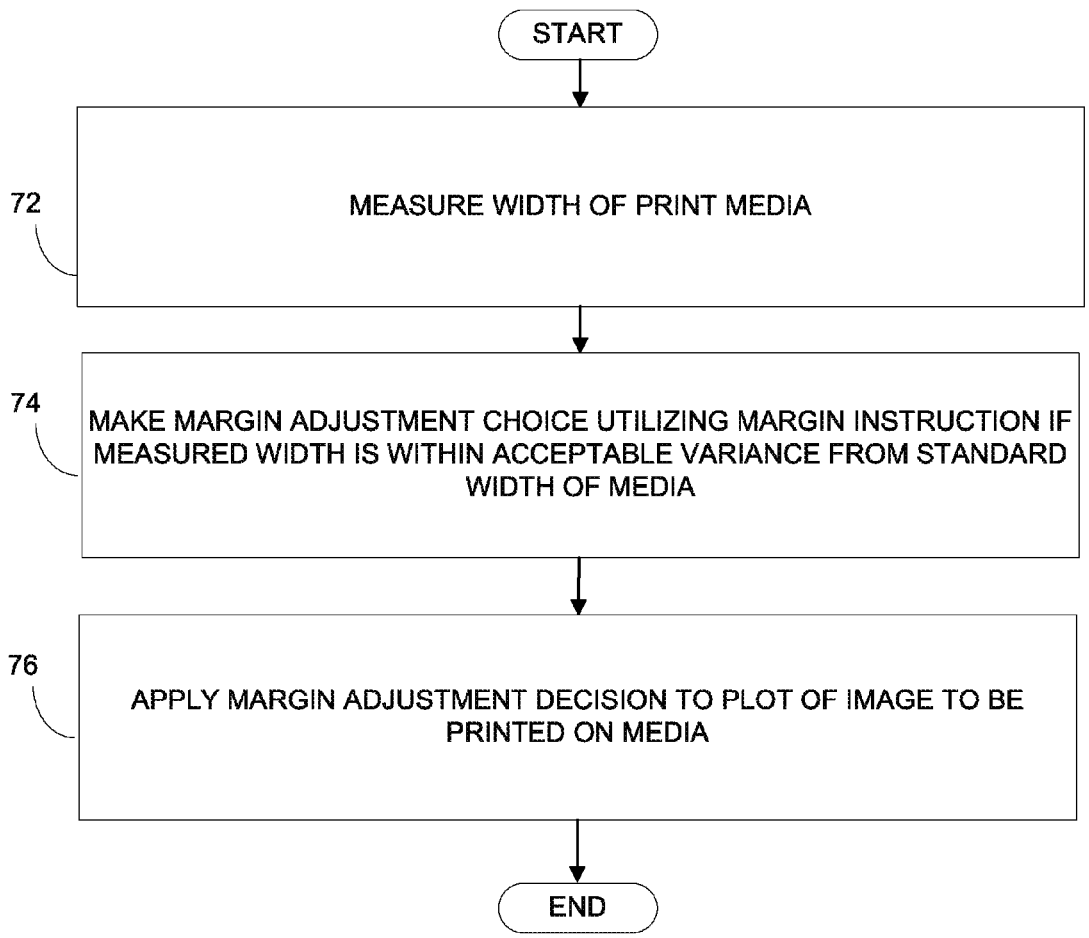
FIGS. 6-7 are flow diagrams depicting steps taken to implement various embodiments.
Figure 7:
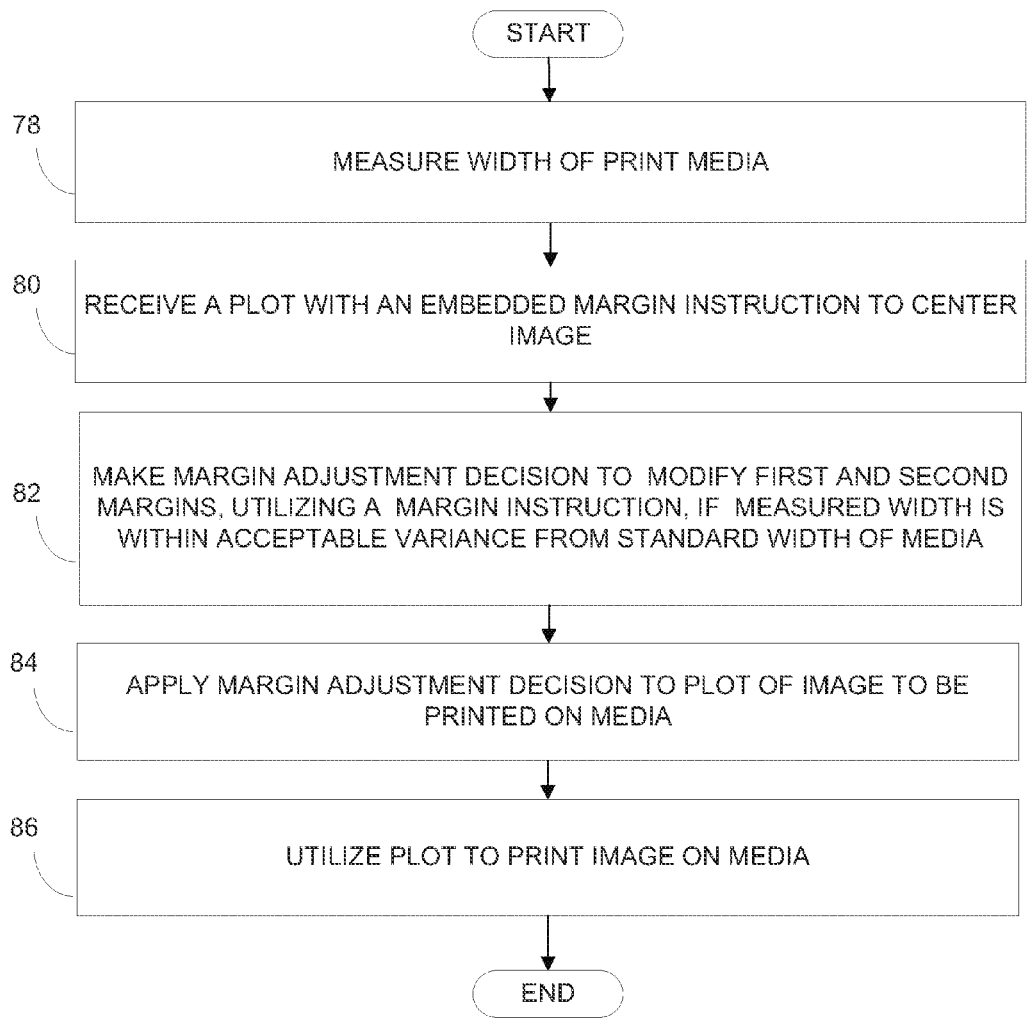

OPERATION: FIGS. 6 and 7 are example flow diagrams of steps taken to implement the making and applying of a margin adjustment decision, in accordance with an embodiment. In discussing FIGS. 6 and 7, reference may be made to the diagrams of FIGS. 1-5 to provide contextual examples. Implementation, however, is not limited to those examples.

Starting with FIG. 6, a width of a print media is measured (block 72). Referring back to FIG. 2, the measurement engine 22 may be responsible for implementing block 72. In an embodiment, an optical sensor is included within a printer's media loading apparatus and is configured to scan and measure the print media at the time the media is loaded into a printer.

Continuing with the flow diagram of FIG. 6, a margin adjustment decision is made utilizing a margin instruction if the measured width is within an acceptable variance from a standard width of the media (block 74). Referring back to FIG. 2, the decision engine 24 may be responsible for implementing block 74. In an embodiment, the margin instruction may be embedded in a plot of an image to be printed, and the margin instruction is read from the plot. In an embodiment the margin instruction may be a default instruction that is stored in, and read from, memory. In an embodiment, a margin instruction may be an instruction to center an image. In an embodiment, a margin instruction may be an instruction to maintain one margin, to maintain a left margin, or to maintain a right margin. In an embodiment, a margin instruction may be an instruction to make no margin adjustments when the measured width of a media is within an acceptable variance from the standard width. In an embodiment, a margin adjustment decision to modify both a first margin and a second margin on a print media may be made in response to a margin instruction to center an image. In another example, a margin adjustment decision to maintain a first margin and modify a second margin may be made in response to a margin instruction to keep one of a left margin or a right margin. In another example, a margin adjustment decision to make no margin adjustments may be made in response to a margin instruction that is received and which directs that no margin adjustments be made when the measured width of a media is within an acceptable variance from the media's standard width.

Continuing with the flow diagram of FIG. 6, the margin adjustment decision is applied to a plot of an image to be printed on the media (block 76). Referring back to FIG. 2, the application engine 26 may be responsible for implementing block 76. In an embodiment, the margin adjustment decision may be applied to the plot by embedding the margin adjustment decision into the plot. In an embodiment, the margin adjustment decision may be applied to a plot of an image to be printed on the media by communicating the decision to a printer separately from the plot, the printer being configured to accept the margin adjustment decision as superseding margin instructions set forth in the plot. In an embodiment, applying a margin adjustment decision to a plot results in the margin decision overwriting any default margin configurations that would have been effected but for such applying of the application decision.

Moving on to FIG. 7, in a particular implementation, a width of a print media is measured (block 78). Referring back to FIG. 2, the measurement engine 22 may be responsible for implementing block 78. In an embodiment an optical sensor is included within a printer's media feeding apparatus and configured to scan and measure the print media at printer startup or upon receipt of a print job.

Continuing with the flow diagram of FIG. 7, a plot with an embedded margin instruction is received. In this example, the margin instruction directs that an image be centered when the measured width of the media to be printed upon is within an acceptable variance from the media's standard width (block 80). Referring back to FIG. 2, the decision engine 24 may be responsible for implementing block 80. In an embodiment, the margin instruction may be embedded in the plot using a PJL that will indicate to the printer how to manage the margin layout.

Continuing with the flow diagram of FIG. 7, if the measured width is within an acceptable variance from standard width of media, a margin adjustment decision is made utilizing the margin instruction to center the image. The margin adjustment decision is a decision to modify a first and a second margin to center the image on the media (block 82). Referring back to FIG. 2, the decision engine 24 may be responsible for implementing block 82. In an embodiment, the standard width is determined by utilizing a sensor to a read bar code or other marking that appears on packaging or written materials that accompany the print media.

Continuing with the flow diagram of FIG. 7, the margin adjustment decision is applied to a plot of an image to be printed on the media (block 84). Referring back to FIG. 2, the application engine 26 may be responsible for implementing block 84. In an embodiment, the margin adjustment decision may be embedded into the plot using a PJL that will indicate to the printer how to manage the margin layout.

Continuing with the flow diagram of FIG. 7, the plot is used to print the image on the media (block 86). Referring back to FIG. 2, the application engine 26 may be responsible for implementing block 86. In an embodiment, the plot may be in HPGL/2, PostScript, PDF, JPEG, TIFF or PCL3 format, and provides the image to be printed and instructions for printing the image on the media. In an embodiment, raster image processing may take place after receipt of the plot and before printing.

EXAMPLES: The diagrams of FIGS. 8A, 8B, and 8C provide an example implementation of a method and system to make and apply a margin adjustment decision. Starting with FIG. 8A, a sensor 88 is utilized in measuring a width 92 of a print media 90 at 598 mm. It is determined that the print media 90 has a standard width 94 of 600 mm. In embodiments, the standard width 94 may be determined utilizing a sensor to read a marking on the media, by utilizing a sensor to read a marking on packaging or other materials that related to the media, or by user input via a user interface, or by other means.

Moving to FIG. 8B, a plot is received that includes instructions to print an image 88 with a width of 588 mm between a left margin 96 of 6 mm and a right margin 98 of 6 mm on a media with a standard size 94 of 600 mm. The plot also includes a margin instruction to center the image if it is found that the measured width 92 of the media 90 is within an acceptable variance of the standard width 94 of the media 90.

In this example, we assume a policy that that any measured width of a media that is within +−3 mm from the standard width is with an acceptable variance from the standard width. The −2 mm difference 100 between the measured width 92 and the standard width 94 is within the +−3 mm acceptable variance, therefore a margin decision utilizing a margin instruction can be made and printing of the image 88 to the media 90 can continue without changing media size or changing the width of the image 88.

FIG. 8C illustrates a printed media 102 that is the end result of the application of the margin adjustment decision to modify the left 96 (FIG. 8B) and right 98 (FIG. 8B) margins of the plot of the image 88 (FIG. 8B). After application of the margin decision, the plot includes a modified left margin 104 that has a width of 5.97 mm and a modified right margin 106 has a width of 5.97 mm.

CONCLUSION: The diagram of FIG. 1 is used to depict an example environment in which various embodiments may be implemented. Implementation, however, is not so limited. FIGS. 2-5 show the architecture, functionality, and operation of various embodiments. Various components illustrated in FIGS. 2-5 are defined at least in part as programs. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s).

Also, the present disclosure may be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 6-7 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:
1. A method, comprising:
providing a print media intended to have a standard width;
measuring a width of the print media;
determining that the measured width of the print media deviates from the intended standard width of the print media;
making a margin adjustment decision utilizing a margin instruction if the deviation of the measured width is within an acceptable variance from the intended standard width of the print media; and applying the margin adjustment decision to a plot of an image to be printed on the print media.

2. The method of claim 1, wherein the margin instruction is received via a user interface.

3. The method of claim 1, wherein the margin instruction is embedded in the plot and the method further comprises reading the margin instruction from the plot.

4. The method of claim 1, wherein the margin instruction is a default instruction and the method further comprises reading the margin instruction from memory.

5. The method of claim 1, wherein the margin instruction comprises an instruction to center the image on the print media.

6. The method of claim 5, wherein the margin adjustment decision comprises modifying a first margin and a second margin to center the image on the print media.

7. The method of claim 1, wherein the margin instruction comprises an instruction to maintain one margin.

8. The method of claim 7, wherein the margin adjustment decision comprises maintaining a first margin and modifying a second margin.

9. The method of claim 1, further comprising receiving the intended standard width via a user interface.

10. The method of claim 1, further comprising receiving the intended standard width via a sensor reading.

11. The method of claim 10, wherein the sensor reading comprises a sensor reading of at least one of a marking on the print media and a marking on packaging material of the print media.

12. A system, comprising:
a measurement engine, configured to measure an actual width of a print media, the print media intended to have a standard width;
a decision engine, configured to recognize that the measured actual width of the print media deviates from the intended standard width of the print media and make a margin adjustment decision utilizing a margin instruction if the deviation of the measured actual width is within an acceptable variance from the intended standard width of the print media; and
an application engine, configured to apply the margin adjustment decision to a plot of an image to be printed on the print media.

13. The system of claim 12, wherein the margin instruction is embedded in the plot and the method further comprises reading the margin instruction from the plot.

14. The system of claim 12, wherein the margin instruction comprises an instruction to center the image on the print media, and wherein the margin adjustment decision comprises modifying a first margin and a second margin to center the image on the print media.

15. The system of claim 12, wherein the margin instruction comprises an instruction to maintain one margin, and wherein the margin adjustment decision comprises maintaining a first margin and modifying a second margin.

16. The system of claim 12, wherein the print media is a roll media, and wherein the measurement engine is configured to measure the actual width of the print media when the print media is loaded.

17. A non-transitory computer readable medium storing computer executable instructions that when executed implement a method, the method comprising:
measuring a width of a print media, the print media declared to have a standard width;
determining that the measured width of the print media deviates from the declared standard width of the print media;
making a margin adjustment decision utilizing a margin instruction if the deviation of the measured width is within an acceptable variance from the declared standard width of the print media; and
applying the margin adjustment decision to a plot of an image to be printed on the print media.

18. The medium of claim 17, wherein the margin instruction is embedded in the plot and the method further comprises reading the margin instruction from the plot.

19. The medium of claim 17, wherein the margin adjustment decision comprises modifying a first margin and a second margin to center the image on the print media, maintaining the first margin and modifying the second margin, or making no margin adjustments.

20. The medium of claim 17, wherein the print media is a roll media, and wherein measuring the width of the print media includes measuring the width of the print media upon receipt of a print job for the plot of the image.

* * * * *